T. G. Crosby.
Steering.
Nº 45,959.     Patented Jan. 17, 1865.
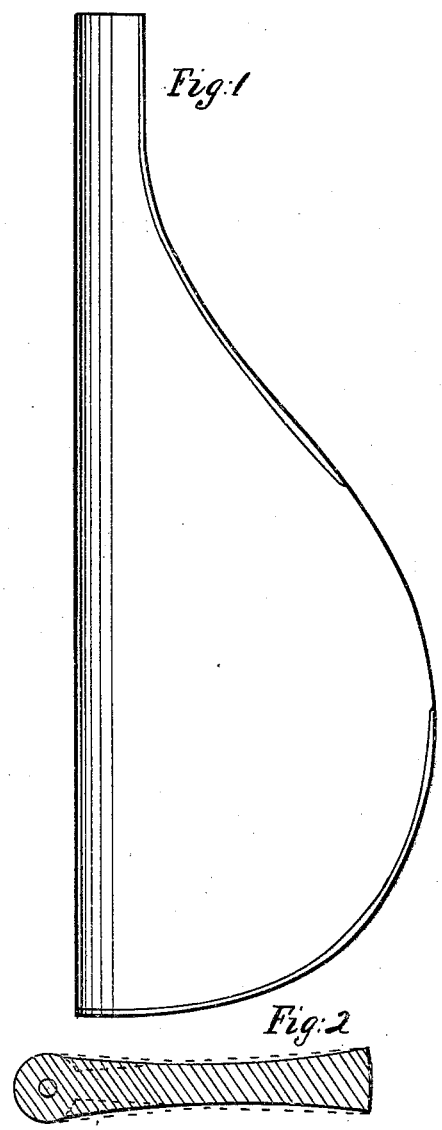
Witnesses.
Thomas J. Conry
James Sevester
Inventor
Thos. G. Crosby

UNITED STATES PATENT OFFICE.

THOMAS G. CROSBY, OF BUFFALO, NEW YORK, ASSIGNOR TO BUSHNELL STRONG AND MARJORIE H. CROSBY.

IMPROVED RUDDER.

Specification forming part of Letters Patent No. 45,959, dated January 17, 1865.

*To all whom it may concern:*

Be it known that I, THOMAS G. CROSBY, of Buffalo, in the county of Erie and State of New York, have invented a new and useful Improvement in Rudders for Vessels; and I do hereby declare that the following is a full and exact description thereof, reference being had to the accompanying drawings, and to the letters of reference marked thereon.

The nature of my invention consists in constructing a rudder with hollow or concave sides.

To enable others skilled in the art to make and use my invention, I will proceed with the description.

I construct my rudder of the usual materials—wood and iron. It is operated in the usual way.

Figure 1 represents a side elevation showing the general form of the rudder. Fig. 2 represents a section cut crosswise through the center of rudder, showing the shape of the concave sides.

What I claim as my invention, and desire to secure by Letters Patent, is—

Constructing a rudder for vessels with concave sides, as herein substantially set forth.

THOS. G. CROSBY.

Witnesses:
    THOS. J. CONRY,
    JAMES SANGSTER.